United States Patent Office 2,876,268
Patented Mar. 3, 1959

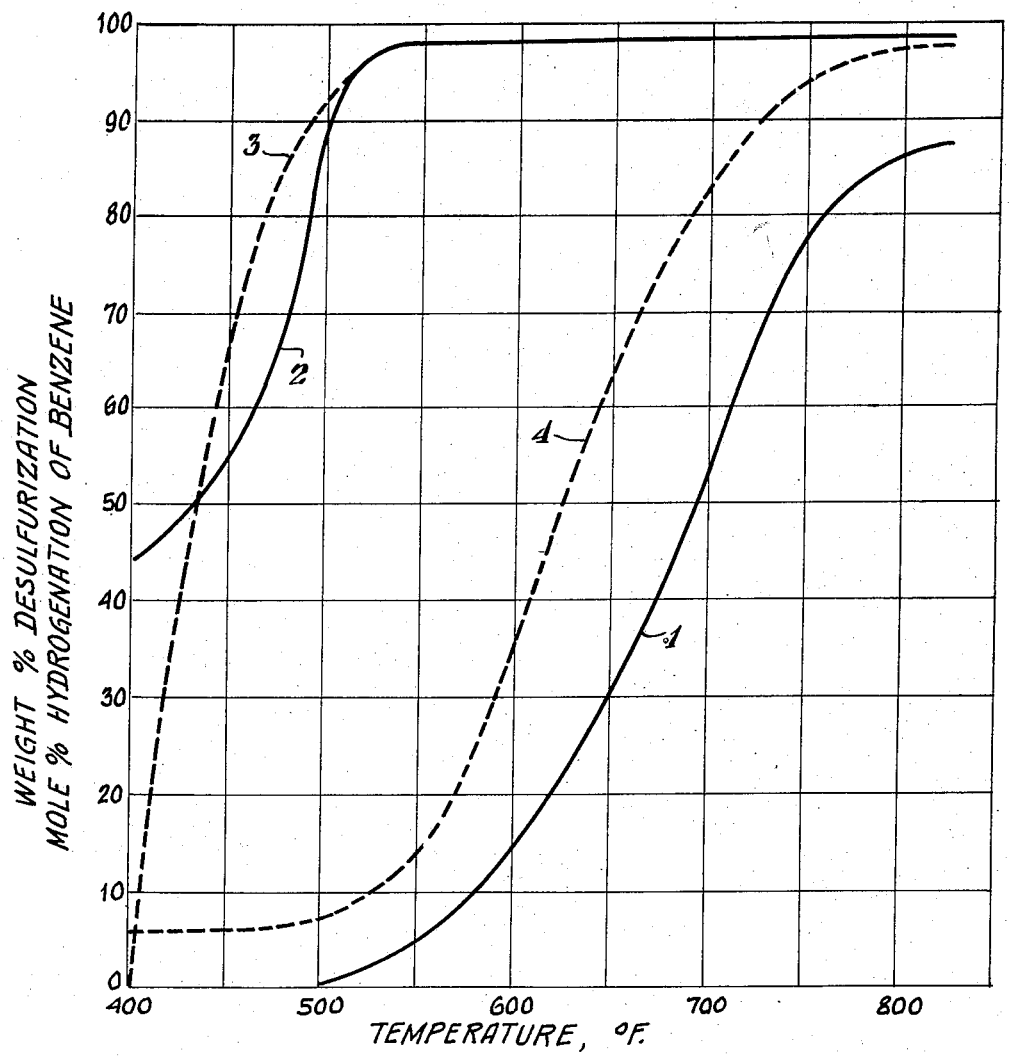

2,876,268

PURIFICATION OF BENZENE USING A PLATINUM-CONTAINING CATALYST

Frank G. Ciapetta, Upper Darby, Pa., and Emil Koft, Jr., Woodbury Heights, and Seymour L. Meisel, Woodbury, N. J., assignors to Socony Mobil Oil Company, Inc., a corporation of New York Application May 21, 1956, Serial No. 586,063

3 Claims. (Cl. 260—674)

This application relates to the purification of crude benzene. It is more particularly concerned with a hydrogenative method for removing thiophenic impurities from benzene.

As is well known to those skilled in the art, crude benzene ($C_6H_6$), such as is derived from coal tar distillation, is contaminated with greater or lesser amounts of thiophene and thiophenic compounds. As these materials boil at temperatures very near to that of benzene itself, separation by distillation methods is virtually impossible. Accordingly, resort has been had to various methods, such as, for example, extraction with sulfuric acid. Recoveries, however, are often relatively poor, because of the difficulty in controlling the extraction process. Processes for the catalytic hydrodesulfurization of hydrocarbon fractions are known. Such processes, however, are disadvantageous for removal of thiophenic materials from benzene, because, concurrent with the removal of sulfur, there is a tendency to hydrogenate substantial amounts of the benzene to cyclohexane.

It has now been found that thiophenic materials can be removed from crude benzene by a process that is simple and commercially feasible. It has been discovered that crude benzene can be purified by hydrogenative treatment in the presence of platinum-containing catalysts, under carefully controlled conditions.

Accordingly, it is an object of the present invention to provide a process for the purification of crude benzene. Another object is to provide a method for removing thiophenic materials from crude benzene that is simple and commercially feasible. A specific object is to provide a method for removing thiophenic materials from crude benzene by means of a hydrogenative treatment that does not appreciably effect hydrogenation of the benzene. A more specific object is to provide a process for purifying crude benzene by hydrogenative treatment in the presence of a platinum-containing catalyst, under carefully controlled conditions. Other objects and advantages of the present invention will become apparent to those skilled in the art from the following detailed description considered in conjunction with the drawing wherein there is set forth the graphic relationship between the temperature and the mole percent benzene hydrogenated and between the temperature and the weight percent desulfurization that occurs when benzene containing thiophenic material is contacted with each of two platinum-containing catalysts of varying platinum content, in the presence of hydrogen.

In general, the present invention provides a method for the removal of thiophenic materials from a benzene fraction containing thiophenic materials with a platinum-containing catalyst in the presence of hydrogen in amounts expressed in terms of the mole ratio of hydrogen to hydrocarbon, varying between about 1 to about 20, at pressures varying between about 100 p. s. i. g. and about 1500 p. s. i. g., at a liquid hourly space velocity varying between about 0.1 and about 20, and within a 25-degree temperature range that falls within the range varying between about 400° F. and about 600° F.

The catalysts utilizable herein are platinum-containing catalysts. These catalysts comprise platinum metal in amounts varying between about 0.05 weight percent and about 2 weight percent, preferably 0.1–1 percent, by weight of the catalyst, distended upon a carrier. The carriers utilizable include pumice, charcoal, silica, alumina, silica-alumina, silica-alumina-zirconia, alumina-boria and the like. These catalysts can be prepared by any of the methods well known to those skilled in the art. A suitable method involves impregnating the carrier with a platinum compound, such as chloroplatinic acid, calcining the impregnated carrier, and reducing and activating the platinum in the presence of hydrogen.

The process of this invention must be carried out under carefully controlled conditions. In order to insure substantially complete removal of thiophenic materials without hydrogenating the benzene to cyclohexane in any appreciable amounts, the primary process variable that must be controlled is the temperature, as is demonstrated hereinafter. The other process variables, however, must also be controlled to some extent. Accordingly, the pressure will vary between about 100 p. s. i. g. and about 1500 p. s. i. g., preferably between about 200 p. s. i. g. and about 1200 p. s. i. g. The molar ratio of hydrogen to hydrocarbon will vary between about 1 and about 20, preferably between about 4 and about 12. The liquid hourly space velocity utilizable varies between about 0.1 and about 20, and preferably between about 0.5 and about 10.

As will be readily apparent, the process of this invention can be operated feasibly by means of a continuous operation. The process can be carried out in the presence of a moving mass of catalyst or in a fluid operation. It is particularly feasible, however, to carry out the process in the presence of a fixed bed of catalyst or of the so-called "fluidized" static bed catalyst.

EXAMPLE 1

The charge material used in this example was a mixture of 70 mole percent cyclohexane and 30 mole percent benzene that had sufficient 3-methylthiophene added thereto to make the sulfur content of the charge 0.54 weight percent. In a series of runs, the charge stock was contacted with a catalyst comprising 0.4 weight percent platinum deposited upon alumina (an activated alumina of commerce) and in the presence of hydrogen. The molar ratio of hydrogen to hydrocarbon used was 10, the liquid hourly space velocity was 1, and the hydrogen pressure was 1000 p. s. i. g. Each run was carried out at a different temperature falling within the range varying between about 450° F. and about 800° F. The pertinent data and run results are set forth in Table I.

Table I

| Run | A | B | C | D | E | F | G |
|---|---|---|---|---|---|---|---|
| Av. Temperature, ° F | 400 | 450 | 525 | 601 | 680 | 761 | 835 |
| Pressure, p. s. i. g | 1,000 | 1,000 | 1,000 | 1,000 | 1,000 | 1,000 | 1,000 |
| LHSV | 1 | 1 | 1 | 1 | 1 | 1 | 1 |
| H₂/hydrocarbon, moles | 10 | 10 | 10 | 10 | 10 | 10 | 10 |
| Benzene conversion, percent [1] | | 0.7 | 5.3 | 12.0 | 38.9 | 77.7 | 86.7 |
| Percent Desulfurization | 44.6 | 53.6 | 96.9 | 97.8 | 98.7 | 98.1 | 99.8 |

[1] Mole percent benzene converted into cyclohexane.

Curves 1 and 2 in the figure are based upon the data set forth in Table I. Curve 1 shows the graphic relationship between the temperature and the mole percent conversion of the benzene into cyclohexane that occurs when the sulfur-contaminated benzene fraction was treated in the presence of hydrogen and of the platinum-containing catalyst. Curve 2 presents the graphic relationship between the temperature and the weight percent desulfurization that occurs simultaneously with the hydrogenation set forth in curve 1. It will be noted that at a temperaure of about 500° F. none of the benzene has been hydrogenated, yet 90 percent of the sulfur had been removed therefrom. At a temperature of 525° F. less than 5 percent of the benzene had been hydrogenated, whereas 98 percent of the sulfur had been removed. At higher temperatures there is no substantial increase in the amount of desulfurization, but the amount of hydrogenation commences to rise relatively rapidly. Accordingly, in order to obtain feasible purification of the benzene, the temperature must be at least about 500° F. In order to avoid the hydrogenation of benzene to an appreciable extent, however, the temperature should not be greater than about 525° F. These temperatures, of course, will vary slightly at other pressures and liquid hourly space velocities. Accordingly, the process of this invention is carried out within a temperature range of about 25° F. that falls within the range varying between about 400° F. and about 600° F., and preferably between about 450° F. and about 550° F. The 25-degree operating temperature band will, as mentioned hereinbefore, shift somewhat within these broad and preferred temperature ranges as the space velocity and the pressure are varied. At the higher space velocities, the 25-degree temperature band will fall in the upper regions of the range. On the other hand, higher pressures generally result in moving the 25-degree temperature band toward the lower portion of the temperature range.

Another feature of the process of this invention is that the optimum amount of platinum on the catalyst is somewhat dependent upon the amount of thiophenic materials in the benzene, in order to minimize the amount of hydrogenation of the benzene. This will be apparent from the following example.

EXAMPLE 2

Using the charge material described in Example 1, another series of runs was made. The same operating conditions used in Example 1 were employed. Instead of the 0.4 weight percent platinum-on-alumina catalyst, however, the catalyst used comprised 0.6 weight percent platinum deposited upon alumina. The pertinent data are set forth in Table II.

Table II

| Run | J | K | L | M | N | O | P |
|---|---|---|---|---|---|---|---|
| Temperature, °F | 400 | 450 | 526 | 605 | 683 | 764 | 847 |
| Pressure, p. s. i. g | 1,000 | 1,000 | 1,000 | 1,000 | 1,000 | 1,000 | 1,000 |
| LHSV | 1 | 1 | 1 | 1 | 1 | 1 | 1 |
| H₂/hydrocarbon, moles | 10 | 10 | 10 | 10 | 10 | 10 | 10 |
| Benzene conversion, percent [1] | 8.0 | 6.0 | 8.0 | 31.3 | 74.6 | 94.9 | 97.6 |
| Percent Desulfurization | 0 | 64.7 | 96.7 | 98.3 | 98.7 | 98.9 | 98.7 |

[1] Mole percent benzene converted into cyclohexane.

Curves 3 and 4 in the figure are based upon the data set forth in Table II. Curve 3 shows the graphic relationship between the temperature and the percent desulfurization when the thiophene-containing benzene fraction is contacted, in the presence of hydrogen, with the platinum-on-alumina catalyst that contains 0.6 percent platinum by weight. Curve 4 presents the concurrent relationship between the percent hydrogenation of benzene to cyclohexane and the temperature. Considering curves 2 and 3, it will be apparent that maximum desulfurization is effected at about 500–525° F. regardless of the platinum content of the catalyst, under the operating conditions used herein. Comparing curves 1 and 4, however, it will be noted that the amount of hydrogenation is appreciably higher in the presence of the catalyst having a higher platinum content. In other words, for the particular sulfur content of these runs (0.54 wt. percent), the optimum platinum content is about 0.4 weight percent and 0.6 weight percent is too high. The latter platinum content in the catalyst would be preferred, however, when benzene fractions of higher content are charged.

In practicing the process of this invention, catalysts other than the platinum-on-alumina catalyst can be used. It has been found, however, that not all catalysts are substantially equivalent with respect to results. Thus, for example, catalysts having carriers, such as silica-alumina may permit as much as 10 to 15 percent hydrogenation. It has been found, however, that the carriers contemplated herein are effective at temperatures falling within the ranges specified hereinbefore. Under the conditions of the present process other thiophenic materials are also removed. Accordingly, the process is applicable for the removing of any thiophenic material from sulfur-contaminated, benzene-containing fractions without appreciably hydrogenating the benzene.

Although the present invention has been described in conjunction with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for the removal of thiophenic materials from a benzene fraction containing thiophenic materials that comprises contacting said benzene fraction with a platinum-containing catalyst, in the presence of hydrogen in amounts, expressed in terms of the mole ratio of hydrogen to hydrocarbon, varying between about 1 and about 20, at pressures varying between about 100 p. s. i. g. and about 1500 p. s. i. g., at a liquid hourly space velocity varying between about 0.1 and about 20 and within an operating temperature band of 25 degrees on the Fahrenheit scale falling with the temperature range varying between about 400° F. and about 600° F.; said operating temperature band being between about 500° F. and about 525° F., at a liquid hourly space velocity of about 1 and a pressure of about 1000 p. s. i. g.; and said operating temperature band being below 500–525° F. when the liquid hourly space velocity is lower than about 1 and when the pressure is greater than about 1000 p. s. i. g.; and said operating temperature band being above 500–525° F. when the liquid hourly space velocity is greater than about 1 and when the pressure is below about 1000 p. s. i. g.

2. A method for the removal of thiophenic materials from a benzene fraction containing thiophenic materials that comprises contacting said benzene fraction with a catalyst comprising between about 0.1 percent and about 1 percent, by weight of the catalyst, of platinum deposited upon alumina, in the presence of hydrogen in amounts, expressed in terms of the mole ratio of hydrogen to hydrocarbon, varying between about 4 and about 12, at pressures varying between about 200 p. s. i. g. and about 1200 p. s. i. g., at a liquid hourly space velocity, varying between about 0.5 and about 10, and within an operating temperature band of 25 degrees on the Fahrenheit scale that falls within the range varying between about 450° F. and about 550° F.; said operating temperature band being between about 500° F. and about 525° F., at a liquid hourly space velocity of about 1 and a pressure of about 1000 p. s. i. g.; and said operating temperature band being below 500–525° F. when the liquid hourly space velocity is lower than about 1 and when the pressure is greater than about 1000 p. s. i. g.; and said operating temperature band being above 500–525° F. when the liquid hourly space velocity is greater than about 1 and when the pressure is below about 1000 p. s. i. g.

3. A method for the removal of thiophenic materials from a benzene fraction that contains thiophenic materials that comprises contacting said benzene fraction with a catalyst comprising between about 0.1 percent and about 1 percent, by weight of the catalyst, of platinum deposited upon alumina, in the presence of hydrogen in an amount, expressed in terms of the mole ratio of hydrogen to hydrocarbon, of about 10, at a pressure of about 1000 p. s. i. g., at a liquid hourly space velocity of about 1, and at a temperature varying between about 500° F. and about 525° F.

References Cited in the file of this patent

UNITED STATES PATENTS

| | | |
|---|---|---|
| 2,542,970 | Jones | Feb. 27, 1951 |
| 2,706,209 | Reitz et al. | Apr. 12, 1955 |
| 2,722,501 | Kassel | Nov. 1, 1955 |